United States Patent
Barbour

(10) Patent No.: US 6,293,271 B1
(45) Date of Patent: Sep. 25, 2001

(54) MULTIFUNCTIONAL COOKING POT

(76) Inventor: Rodney A. Barbour, 98 Grandview Cir., Brandon, MS (US) 39047

( * ) Notice: Subject to any disclaimer, the term of this patent is extended or adjusted under 35 U.S.C. 154(b) by 0 days.

(21) Appl. No.: 09/417,336

(22) Filed: Oct. 13, 1999

Related U.S. Application Data

(60) Provisional application No. 60/103,991, filed on Oct. 13, 1998.

(51) Int. Cl.$^7$ .............................. A47J 37/07; A47J 37/00
(52) U.S. Cl. ................. 126/25 R; 126/41 R; 126/369; 126/373; 220/912; 220/DIG. 27
(58) Field of Search ...................... 126/25 R, 369, 126/369.3, 41 R, 9 R, 373, 384; 220/912, 913, 360, 366.1, DIG. 27

(56) References Cited

U.S. PATENT DOCUMENTS

| | | |
|---|---|---|
| 2,241,064 * | 5/1941 | Harison . |
| 3,028,039 * | 4/1962 | Clark . |
| 3,168,062 | 2/1965 | Arnold . |
| 4,058,214 * | 11/1977 | Mancuso ........................... 220/366 |
| 4,220,134 * | 9/1980 | Snyder . |
| 4,373,511 * | 2/1983 | Miles et al. . |
| 4,463,746 * | 8/1984 | Knuth et al. . |
| 4,512,497 * | 4/1985 | Grusin . |
| 4,630,593 | 12/1986 | Gremillion . |
| 4,705,020 | 11/1987 | Hahn . |
| 4,736,867 * | 4/1988 | Feimer et al. . |
| 4,924,845 | 5/1990 | Johnson et al. . |
| 4,957,039 | 9/1990 | Reyes . |
| 5,065,889 * | 11/1991 | Conti . |
| 5,359,988 | 11/1994 | Hait . |
| 5,517,902 | 5/1996 | Boston . |
| 5,528,984 | 6/1996 | Saurwein . |
| 5,531,154 | 7/1996 | Perez, III . |
| 5,588,420 | 12/1996 | Dickson . |

* cited by examiner

*Primary Examiner*—Carl D. Price
(74) *Attorney, Agent, or Firm*—Rader, Fishman, Grauer & McGarry

(57) ABSTRACT

A cooking pot is provided which includes a base portion and a removable cover therefor. An annular lip of the pot is formed with at least one vent opening therein. Airflow between ambient and a cooking chamber defined within the pot is adjustable by rotating the cover relative to the base portion. The cooking pot is also multifunctional in that it is operable in any one of a plurality of cooking modes including but not limited to an open charcoal-grilling mode, a closed charcoal-grilling mode, an externally-heated charcoal-grilling mode, a grilling and smoking mode, a deep-frying mode, a boiling and simmering mode, a steaming mode, and oven modes.

10 Claims, 9 Drawing Sheets

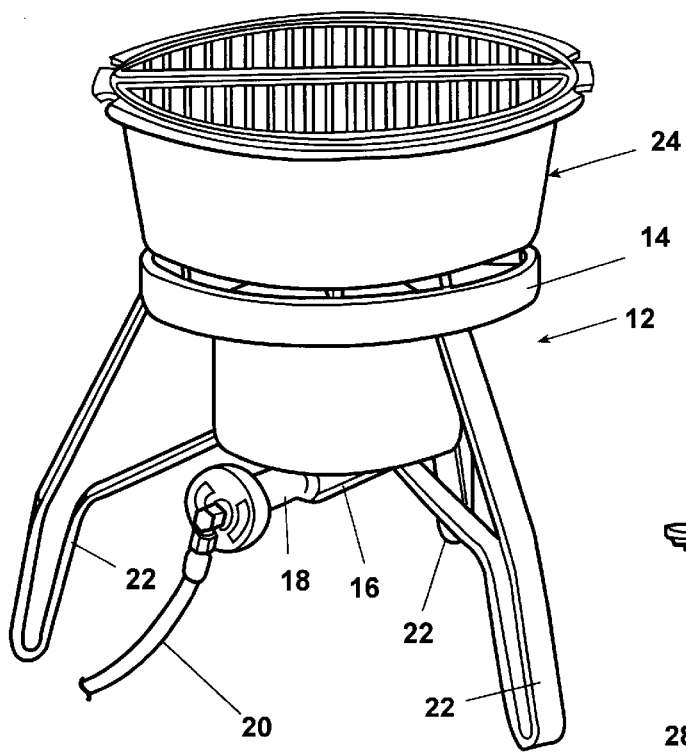
Fig. 3
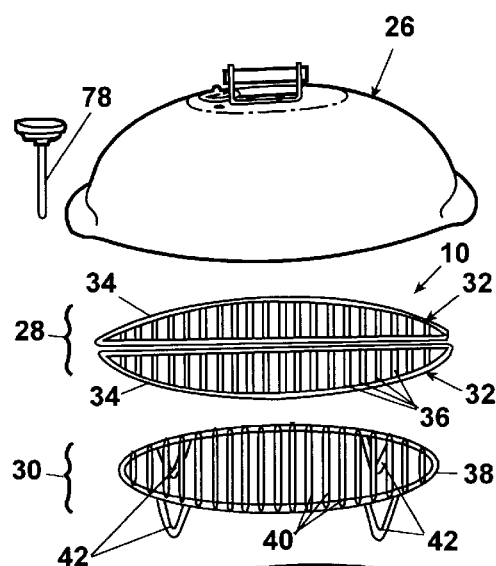
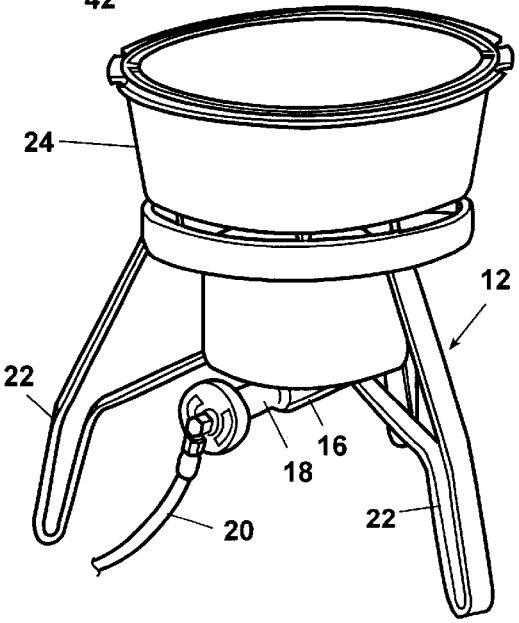
Fig. 4

MULTIFUNCTIONAL COOKING POT

CROSS-REFERENCE TO RELATED APPLICATION

This application claims the benefit of U.S. patent application Ser. No. 60/103,991, filed Oct. 13, 1998.

BACKGROUND OF THE INVENTION

1. Field of the Invention

This invention relates to a pot which can be used for grilling, smoking, frying, boiling, steaming, and baking or roasting, and more specifically, to a pot which can be used in all of such cooking functions and which incorporates an adjustable vent system to adjust the amount of ambient air drawn into the pot during cooking.

2. Related Art

Outdoor cooking requires a wide variety of cooking devices, fuels, vessels and accessories. Various cooking devices include charcoal grills, gas grills, gas cookers, and open uncontrolled fires. These cooking devices require different fuels, for example charcoal, a gas such as butane or propane, or wood or other naturally-occurring fuels. Various cooking vessels include pots, skillets, pans, racks, grills, steamers, smokers, fryers, and a variety of other conventional vessels, each of which is adapted to cook food in a particular manner. Additional accessories, such as cooking racks and steaming baskets, can also be incorporated in such cooking vessels as required by the particular manner in which the food is to be cooked.

These widely varying types of cooking devices and vessels require a great deal of storage space when the outdoor cooking is to be performed in a residential setting, such as at home. These difficulties in storage are exacerbated when the outdoor cooking is to be performed away from home, such as at a vacation cottage or campsite. It is prohibitively difficult to transport the above-cooking devices, vessels and accessories as well as to supply appropriate fuel therefor. These storage space and transportation limitations often restrict the flexibility with which users can cook food in a particular desired manner.

SUMMARY OF THE INVENTION

The present invention provides a cooking pot which includes a base portion and a removable cover therefor, the base portion and the cover defining a cooking chamber. The cover has a generally annular outer edge and is formed with at least one protrusion interrupting the annular configuration of the outer edge. The base portion comprises a vessel having an upstanding wall of circular transverse section, the upstanding wall being provided with an annular lip extending radially outwardly therefrom at an upper portion thereof to seat the outer edge of the cover and thereby removably support the cover on the base portion.

The annular lip is formed with at least one vent opening therein. Thus, airflow between the ambient and the cooking chamber is adjustable by rotating the cover relative to the base portion to align the protrusion with the vent opening to permit free airflow therethrough, to move the protrusion wholly out of alignment with the vent opening to prevent airflow therethrough, and to partially align the protrusion with the vent opening to selectively restrict airflow therethrough.

The invention also provides a multifunctional cooking pot including a base portion and a removable cover having an outer edge, the base portion and the cover defining a cooking chamber. The base portion comprises a liquid-retainable vessel having a an upstanding wall terminating in an upper edge thereof. The multifunctional cooking pot also includes a removable lower rack supported within the base portion, a removable upper rack comprising at least one rack member supported on the base portion above the lower rack, and a cover support provided on the base portion outwardly of the upper rack for receiving the outer edge of the cover in seating relationship. The cooking pot is thus operable in any one of a plurality of cooking modes including but not limited to an open charcoal-grilling mode, a closed charcoal-grilling mode, an externally-heated charcoal-grilling mode, a grilling and smoking mode, a deep-frying mode, a boiling and simmering mode, a steaming mode, and oven modes, all of which are described with particularity hereinafter.

Preferably, the upper rack comprises a pair of rack members complementary to and coplanar with each other to overlie the base portion, the rack members being individually removable. This construction permits the mutifunctional cooking pot to be operable in a further mode comprising a deep-frying and draining mode. In this mode, which will also be described with particularity hereinafter, one of the upper rack members is removed and food when deep-fried is placed on the other upper rack member to drain.

Other objects, features, and advantages of the invention will be apparent from the ensuing description in conjunction with the accompanying drawings.

BRIEF DESCRIPTION OF THE DRAWINGS

In the drawings:

FIG. 3 is a perspective view of the cooking pot of FIG. 1 with the cover removed to expose a pair of half-circle cooking racks disposed adjacent to an upper portion of a base portion of the cooking pot;

FIG. 4 is an exploded perspective view of the cooking pot of FIG. 1;

FIG. 13 is a perspective view showing food placed on upper and lower racks of the cooking pot of FIG. 1 and a cooking liquid placed therebeneath to provide a steaming effect for the food in the cooking pot, whereby steam is allowed to escape through an aperture in the cover of the cooking pot;

DETAILED DESCRIPTION

Figure 1:
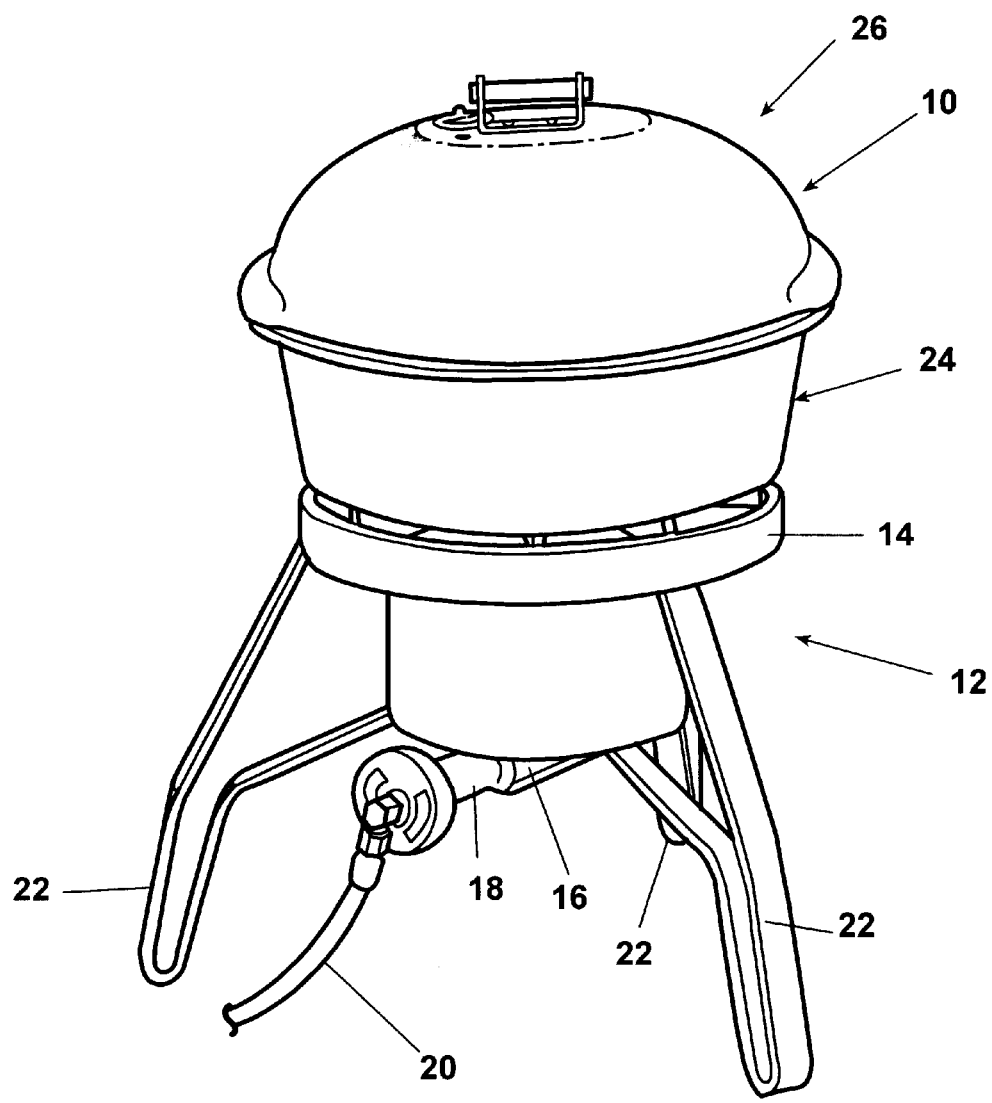
FIG. 1 is a perspective view of a multifunctional cooking pot according to the invention, shown resting on a conventional gas cooker.

FIG. 1 shows a cooking pot 10 according to the invention seated upon a heat source in the form of a conventional gas cooker 12. The gas cooker 12 typically comprises an upper cooking rack 14 located above a burner 16 having a conventional regulator 18 which is interconnected with a fuel source (not shown) by an appropriate conduit 20. The gas cooker can have several legs 22 thereon for supporting the upper cooking rack 14 and burner 16 above a horizontal surface such as the ground. Of course, any known source of heat can be used without departing from the scope of this invention and the cooking pot 10 is not limited to use with the gas cooker 12.

Figure 2:
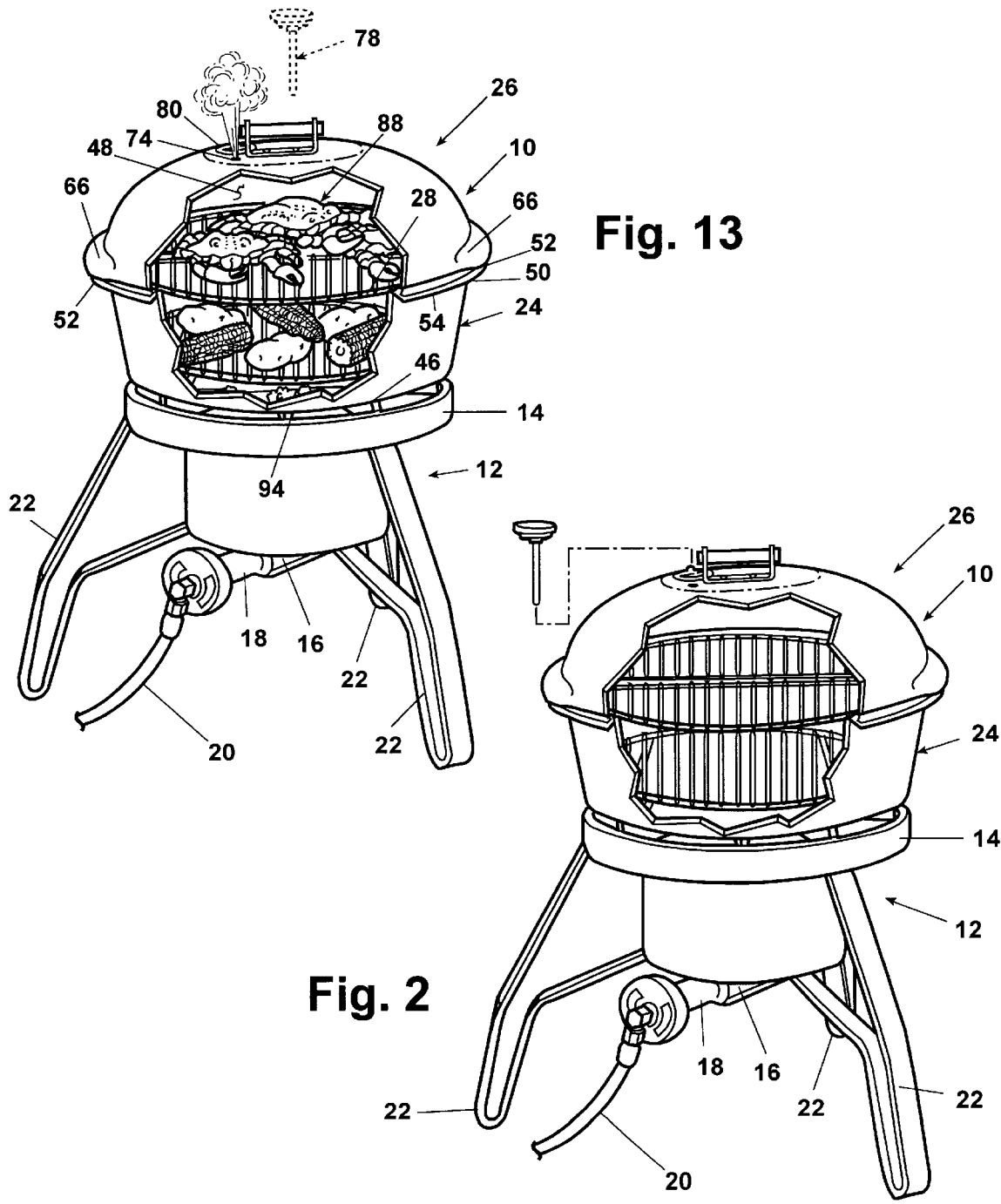
FIG. 2 is a perspective view of the cooking pot of FIG. 1 with a broken-away portion showing the interior of the cooking pot provided with a pair of vertically-spaced cooking racks as well as a cooking thermometer adapted to be inserted within an aperture at an upper portion of a cover for the cooking pot.

The cooking pot 10 according to the invention comprises a base portion 24 and a cover 26. FIGS. 2–4 show the cooking pot 10 and gas cooker 12 of FIG. 1 in greater detail. The cooking pot 10 also includes an upper cooking rack 28 and a lower cooking rack 30. The upper cooking rack 28 is preferably formed with an outer diameter slightly greater than the inner diameter of the base portion 24 of the cooking pot so that the upper cooking rack 28 can rest on an upper edge of the base portion 24 of the cooking pot 10.

The upper cooking rack 28 is preferably formed as a pair of cooperating cooking rack members 32 complementary to each other and coplanar to overlie the base portion. Preferably each is semicircular, being formed with a semicircular perimeter 34 and several transversely-extending rack elements 36. Other configurations of the upper cooking rack 28 are contemplated, such as a generally circular member; however, it has been found that the split version of the upper cooking rack 28 shown in the drawings is preferable to allow more convenient access to the interior of the base portion 24 of the cooking pot 10.

The lower cooking rack 30 is formed as a generally circular member having a perimeter 38 and several transversely-extending rack elements 40. The lower cooking rack 30 can also be provided with several legs 42 thereon adapted to space the perimeter 38 and rack members 40 of the lower cooking rack 30 from a floor of the base portion 24. However, the upper and lower cooking racks can be supported on the base portion in any suitable manner, as by ledges or shoulders provided on the inner surface of the base portion. It will be understood that the outer diameter of the lower cooking rack 30 is preferably smaller than the inner diameter of the base portion 24 of the cooking pot 10 to allow the lower cooking rack 30 to be placed on the floor of the base portion 24, and elevated a predetermined distance by the legs 42.

Figure 5:
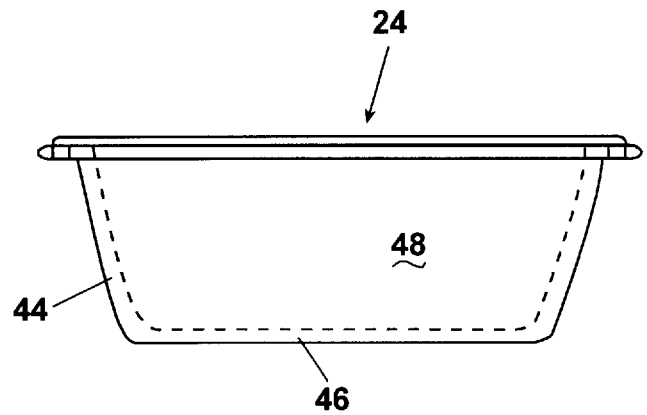
FIG. 5 is a side elevational view of the base portion of the cooking pot of FIG. 1.
Figure 6:
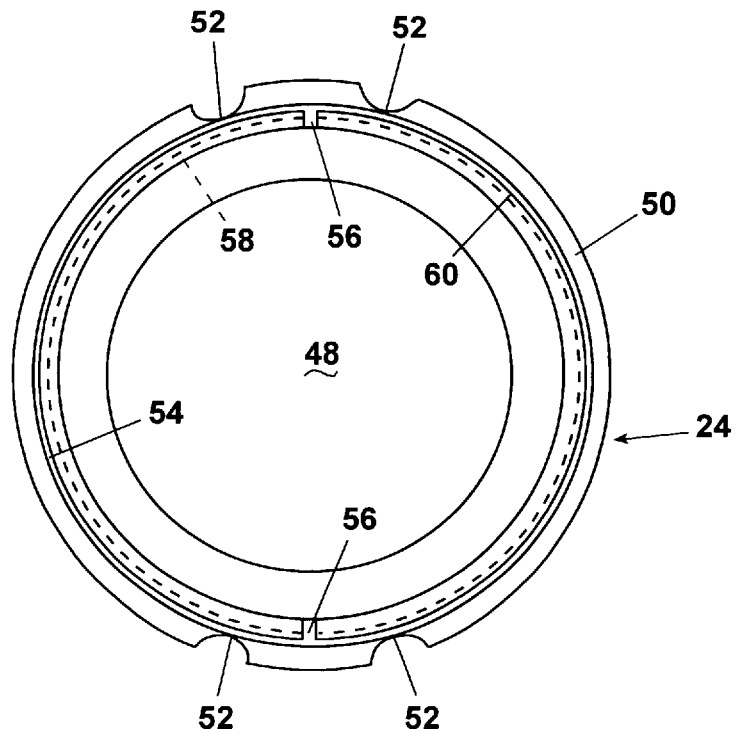
FIG. 6 is a top plan view of the base portion of FIG. 5 showing vent openings therein.

The base portion 24, shown in FIGS. 1–4 and in greater detail in FIGS. 5–6, comprises a liquid-retainable vessel having an upstanding wall 44 and a floor 46 defining a cooking chamber 48 in cooperation with the cover 26. The upstanding wall is preferably of inverted frustoconical form, as shown, but may be cylindrical as well.

Figure 6A:
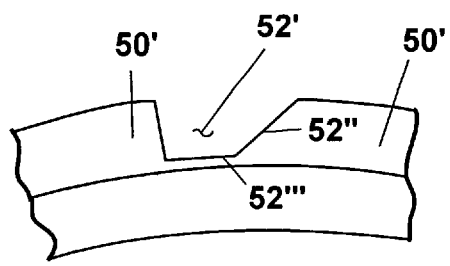
FIG. 6A is a fragmentary top plan view of an alternative embodiment of the vent openings of FIG. 6.

An upper portion of the wall 44 is provided with a radially-extending lip 50 thereon. The lip 50 has a pair of opposed vent openings 52 located in a spaced radial relationship along a common diameter of the lip 50. Although semicircular vent openings 52 are shown in FIG. 6, a virtually limitless variety of other geometrical configurations, such as square, rectangular, oval, elliptical, and polygonal configurations are also contemplated without departing from the scope of this invention. Moreover, an alternative embodiment of the lip 50' is shown in FIG. 6A comprising a gradient-like vent opening 52' defined by an angular surface 52" which terminates in a generally L-shaped wall 52'''.

The lip 50 further includes a circular ridge 54 concentric with the lip 50 and having a diameter preferably smaller than the inwardmost extent of the vent openings 52 of the lip 50. The ridge 54 further has a stop member 56 defined on opposing sides of a common diameter of the ridge 54. Together, the stop members 56 and ridge 54 define appropriately-shaped semicircular recesses 58 and 60 for each of the halves of an appropriately-shaped split upper cooking rack 28, as shown in FIGS. 1 and 4.

Figure 7:
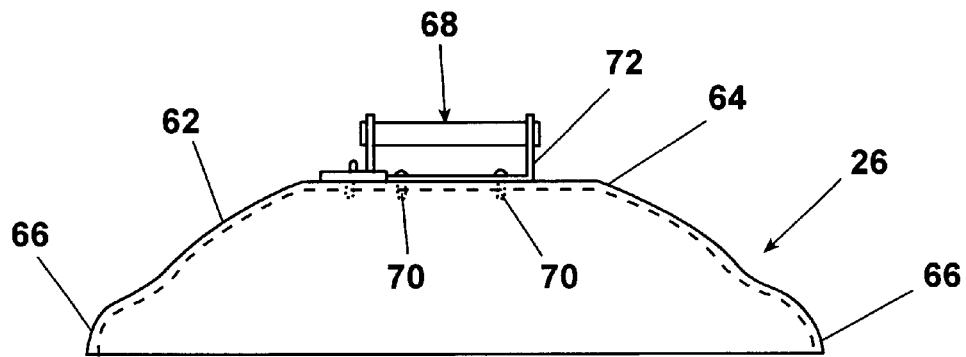
FIG. 7 is a side elevational view of the cover for the cooking pot of FIG. 1.
Figure 8:
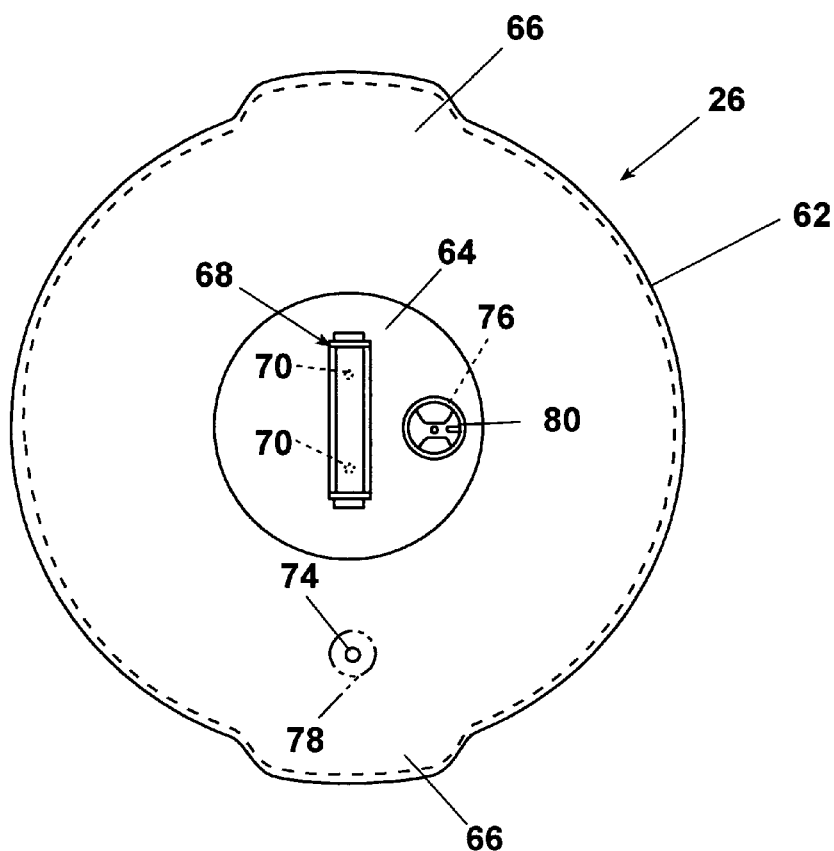
FIG. 8 is a top plan view of the cover of FIG. 7.

The cover 26, shown in FIGS. 1, 2, and 4 and in greater in FIGS. 7–8, comprises a dome-shaped wall, preferably a downwardly-facing generally parabolic wall 62 having a generally planar portion 64 at a central portion thereof. The wall 62 is preferably generally circular at its perimetrical edge notwithstanding a pair of radially-extending protrusions 66 which extend therefrom adjacent to an outer lower edge thereof. The protrusions 66 preferably provide a dual function—first, they are adapted to cover all or a portion of the vent openings 52 in the base portion 24 and, second, they can be employed by a user as handles to lift the cover 26 and transport it as needed.

The planar portion 64 of the cover 26 preferably includes a handle 68 mounted thereto in a conventional manner, as by fasteners 70 that extend through a bracket 72 on the handle 68 through the planar portion 64 of the cover 26. The cover 26 also has a first aperture 74 and a second aperture 76 located in a spaced relationship with one another. The first aperture 74 is preferably appropriately sized to receive a conventional meat thermometer or grill thermometer 78 therein as shown in FIGS. 1, 2 and 4. The second aperture 76 is appropriately sized, as by comprising a pair of opposed similarly-shaped apertures, to receive a rotatable air vent 80 which can be rotated to cover or all a desired portion of the second aperture 76 to control airflow through the second aperture 76. The air vent 80 is well known in the art and thus will not be described further.

Figure 9:
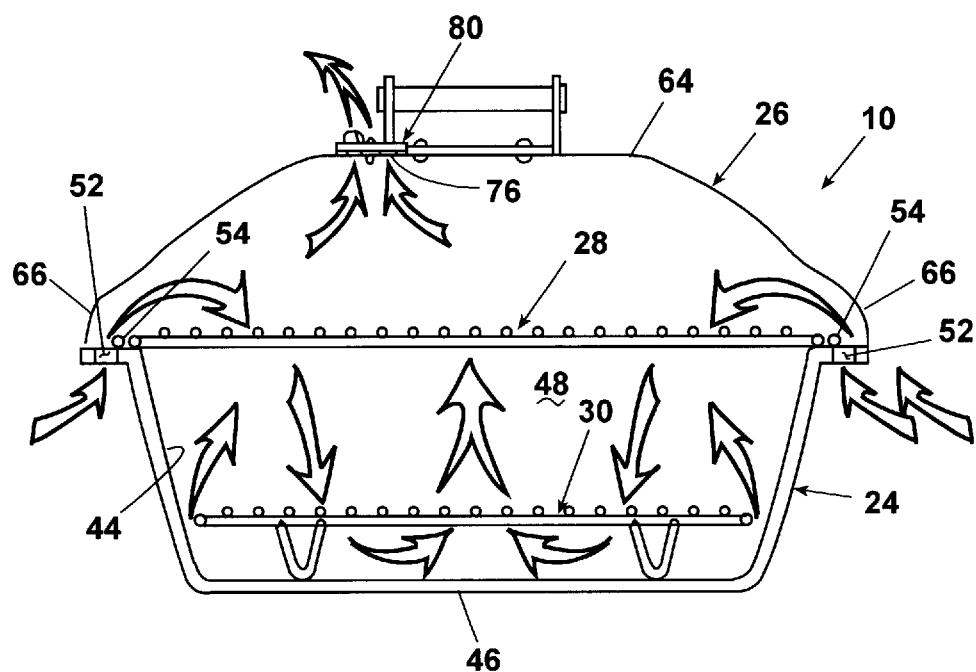
FIG. 9 is a side elevational schematic view of the cooking pot of FIG. 1 with arrows showing the circulation of air through vents defined between the cover and the base portion, throughout the interior of the cooking pot, and outward through an adjustable vent in the cover.
Figure 10:
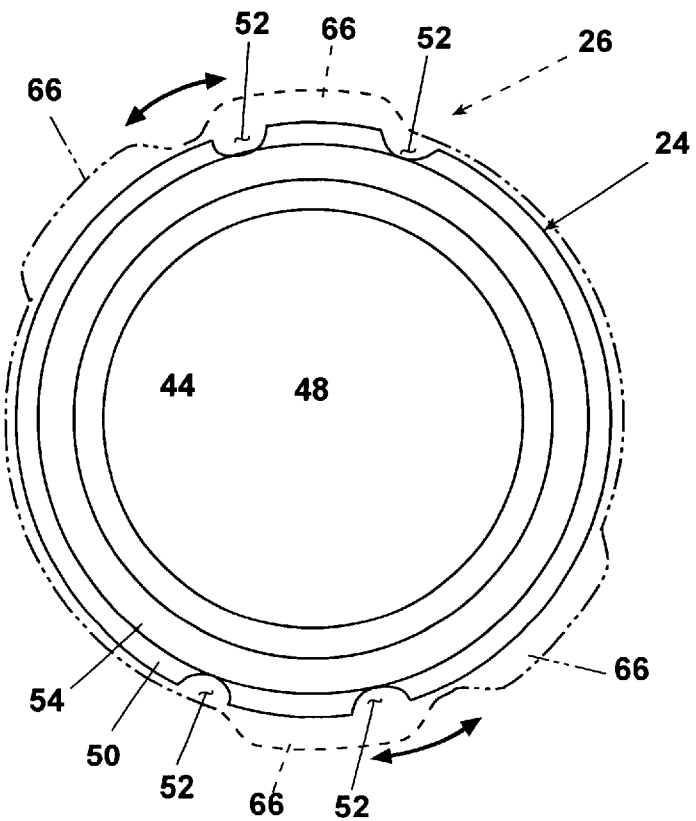
FIG. 10 is a top plan schematic view showing the interaction between the protrusions on the cover and vent openings on the base portion, whereby rotation of the cover relative to the base portion acts to adjust the size of the vent openings defined between the cover and the base portion to allow for lesser or greater volumes of air through the cooking pot as shown in FIG. 9.

FIGS. 9 and 10 illustrate an important feature of this invention, namely the ability of a user to adjust airflow into and out of the cooking pot 10 as desired beyond that provided by the conventional air vent 80. When the cover 26 is placed on the lip 50 of the base portion 24 so that the protrusions 66 completely cover the vent openings 52 and the lip 50, an airflow passage is created through the vent openings 52 into the cooking chamber 48 defined by the interiors of the base portion 24 and cover 26, and through the second aperture 76 as defined by the air vent 80 in cooperation with the planar portion 64 of the cover 26. As shown in FIG. 9, a circulation effect is created through the vent openings 52 so that the air, as represented by the arrows in FIG. 8, circulates downwardly along the floor 46 of the base portion 24 before circulating upwardly toward the second aperture 76 and the air vent 80 through the cover 26 of the cooking pot 10. Thus, the air is circulated effectively through the chamber 48 in the interior of the cooking pot 10 to ensure even distribution of heat throughout. It will be understood that the alternative embodiment 52' of the vent openings 52 can be employed whereby the amount of airflow can be controlled gradiently by positioning the protrusions 66 along the angular surface 52". A non-linear airflow control effect can be provided by altering the curvature of the surface 52" as desired.

As shown in FIG. 9 and schematically in FIG. 10, the extent of the vent openings 52 which cooperate with the chamber 48 of the interior of the cooking pot 10 can be adjusted by rotating the cover 26 relative to the base 10 so that the protrusions 66 on the cover 26 cover all, none, or some intermediate portion of the vent openings 52. Thus, the rate of flow of air entering through the vent openings 52 can be adjusted by such rotation of the cover 26 relative to the base portion 54.

In much the same manner, the conventional air vent 80 located on the upper planar portion 64 of the cover 26 can be adjusted to regulate the airflow through the second aperture 76 as defined by the air vent 80. Thus, the airflow entering the chamber 48 through the vent openings 52 can be defined by rotation of the cover 26 relative to the base portion 24 so that the protrusions 66 cover all, some or none of the vent openings 52 defined in the lip 50 of the base portion 24. The air exiting the chamber 48 of the cooking pot 10 can be defined by adjusting the air vent 80 relative to the second aperture 76 in a known manner. It is also contemplated that the airflow can enter the air vent 80 at the planar portion 64 of the cover 26 and exit through the vent openings 52 in similar manner.

It is an important feature of this invention that the positioning of the air vent 80 as well as the rotational positioning of the cover 26 relative to the base portion 24 define appropriate entry and egress apertures for airflow through the cooking pot 10 and ensure uniform circulation therethrough. FIG. 10 shows an example of the position of the protrusions 66 on the cover 26 relative to the lip 50 and its associated vent openings 52 at a first position whereby the protrusions 66 completely cover the vent openings 52 and a second, intermediate position whereby the protrusions 66 cover a portion of the vent openings 52 to allow for less air to flow through the portion of the vent openings 52 covered by the protrusions 66 of the cover 26. An appropriate thermometer 78 can be inserted into the first aperture 74 and the planar portion 64 of the cover 26 so that the rotational position of the protrusions 66 relative to the vent openings 52 and the position of the air vent 80 relative to the second aperture 76 can be set so that the air circulating through the chamber 48 is allowed to reach and be maintained at a desired temperature for cooking of the food within the chamber 48 of the cooking pot 10.

FIGS. 11–16 show several configurations of the cooking pot 10 and the optional gas cooker 12 for grilling, smoking, baking, steaming, frying or boiling, and a second configuration for grilling various food products in the multifunctional cooking pot 10.

Figure 11:
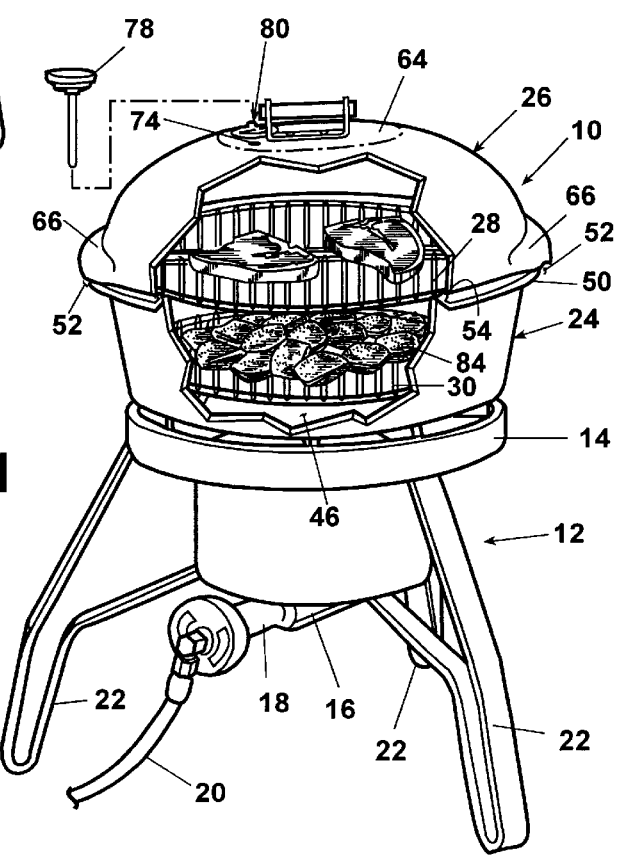
FIG. 11 is a perspective view of the cooking pot of FIG. 1 with a broken-away portion showing meat provided on an upper rack and charcoal provided on a lower rack for grilling of food therein whereby the charcoal can be ignited in conventional fashion without the use of the gas cooker shown in the figure.

FIG. 11 shows a configuration for the cooking pot 10 for grilling food products 82 using charcoal briquettes 84. For grilling food products 82 on the cooker 12, the lower rack 30 is placed on the floor 46 of the base portion 24. The charcoal briquettes 84 are placed on the lower rack 30 in a conventional spread fashion. The upper rack 28 is placed, as previously described, within the recesses 58 and 60 defined by the ridge 64 and the lip 50. The cooker 12 can be actuated so as to heat the charcoal briquettes 84 from the exterior of the pot 10 without the use of conventional lighter fluid or other fuels. The cover 26 can be placed on the lip 50 so that the protrusions 66 cover an appropriate portion of the vent openings 52, and the air vent 80 on the planar portion 64 of the cover 26 can be also positioned so that air circulating through the vent openings 52 and the air vent 80 allows a desirable temperature within the chamber 48 for cooking the food products 82. The thermometer 78 can be inserted within the first aperture 74 on the cover 26 to ensure that the interior of the pot 10 reaches the desired temperature.

This configuration can also be used for smoking food products by employing smoking implements as are commonly known in the art. Typically, a combination of wood chips and charcoal briquettes is used under temperatures minimally required to smolder the wood chips to create the smoke.

Figure 12:
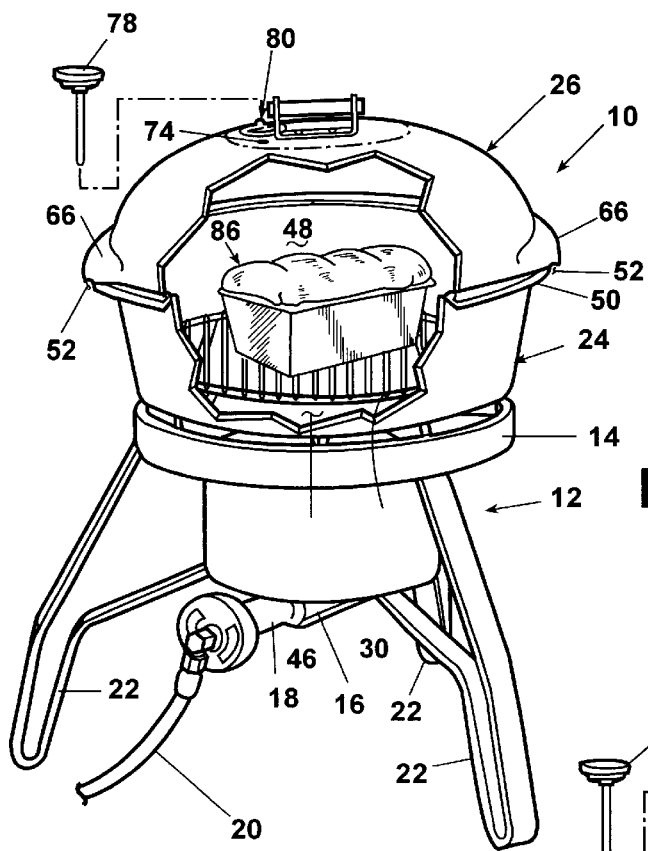
FIG. 12 is a perspective view of the cooking pot of FIG. 1 with a broken-away portion showing food placed on a lower rack with the remaining portions of the cooking pot remaining empty to provide a baking function for food.

FIG. 12 shows a configuration for the cooking pot 10 appropriate for baking or roasting a food product 86, such as bread, or other leavened goods. When used with a heating source external to the pot 10, the pot 10 can function as a typical oven whereby the chamber 48 thereof can be heated to a desired temperature. When air circulation is employed through the vent openings 52 and air vent 80, a convection-type oven effect is created. For this baking or roasting configuration, the lower rack 30 is placed on the floor portion 46 of the base portion 24 and the gas cooker 12 is actuated to apply heat to the exterior of the base portion 24. The food product 86 is placed on the lower rack 30 and the cover 26 is placed upon the base portion 24 as previously described. Once again, the protrusions 66 and vent openings 52 are aligned and an appropriate setting imparted to the air vent 80 so that a desired temperature is achieved through appropriate circulation as read by the thermometer 78. Of course, the upper rack 28 can also be employed to cook more than one food product 86 at different heights. Due to the homogeneous circulation of the air throughout the chamber 48 of the cooking pot 10, beneficial cooking results can be achieved in this manner as well.

FIG. 13 shows an appropriate configuration of the cooking pot 10 for steaming food products 88, 90, and 92 therein. In this configuration, the lower rack 30 is placed on the floor portion 46 of the base portion 24 to receive food products 90 and 92. Moreover, the upper rack 28 is placed, as previously described, into the recesses 58 and 60 as defined by the ridge 54 and the lip 50 to receive food products 88 thereon. A cooking fluid 94, preferably water for the purposes of steaming, is provided on the floor portion 46 to a desired level within the chamber 48 defined by the base portion 24 and cover 26 and is heated by actuation of the cooker 12. The rotational position of the cover 26 relative to the base portion 24 can be positioned so that the protrusions 66 cover a desired portion of the vent openings 52 therein and the air vent 80 is positioned at an appropriate location as well. The thermometer 78 can be provided, as shown by the phantom outline in FIG. 13; however, it may also be desirable to remove the thermometer 78 and leave the first aperture 74 exposed to allow the exhaust of steam from the interior of the cooking pot 10.

Figure 14:
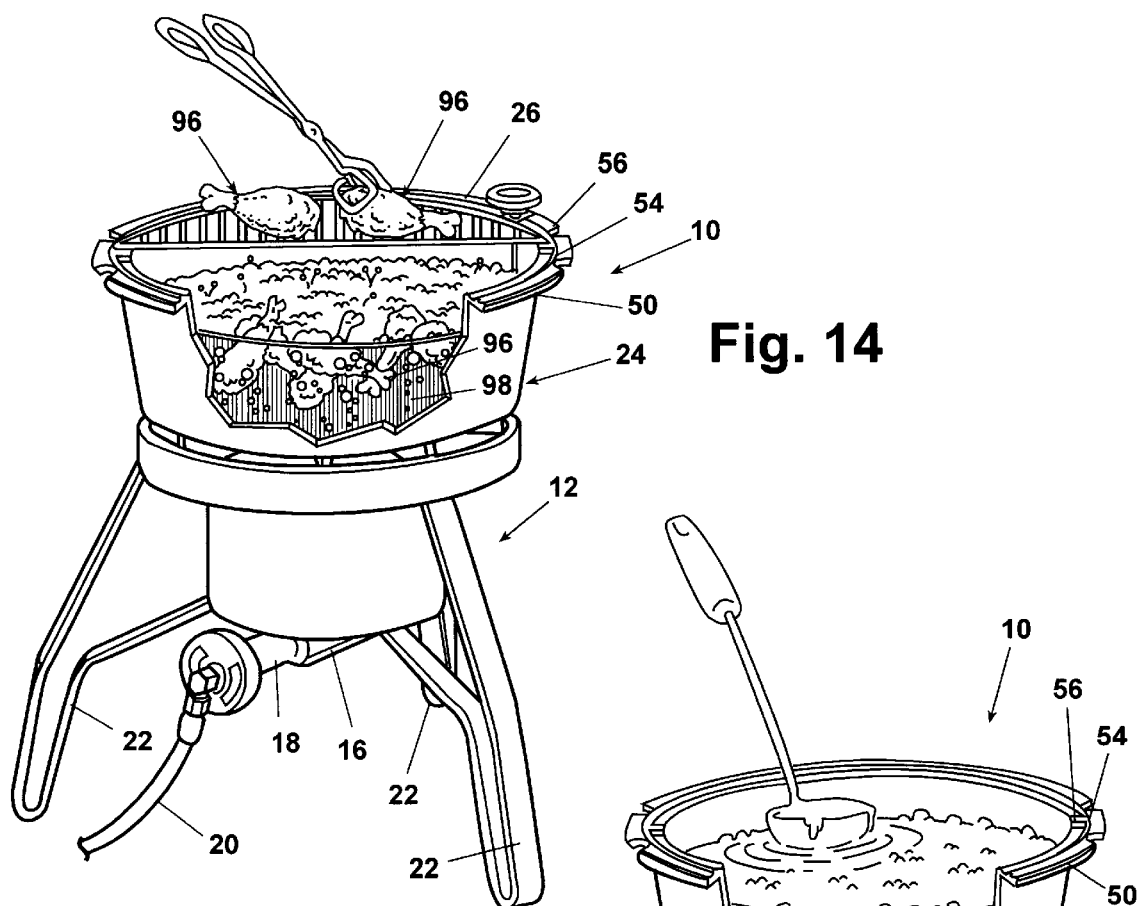
FIG. 14 is a perspective view of the cooking pot of FIG. 1 with the cover removed and an upper rack provided on only half of an upper portion of the base portion of the cooking pot with a cooking fluid provided therebeneath, whereby food is fried in the cooking fluid and allowed to drain on the upper half rack of the base portion.

FIG. 14 shows an appropriate arrangement of the cooking pot 10 for frying food products 96. In this configuration, the cover 26 has been removed leaving, an open upper end of the base portion 24 defined by the lip 50. Here, a cooking fluid 98 is provided within the base portion 24 so that the food products 96 can be deep fried upon actuation of the gas cooker 12. The upper cooking rack 28 is seated in the recesses 58 and/or 60 as defined by the ridge 54 and lip 50. In the configuration shown in FIG. 14, one half of the upper cooking rack 28 has been provided to allow a portion of the previously-fried food products 96 to drain excess oil while the remainder of the food products 96 are fried within the cooking fluid 98 by application of heat by the cooker 12.

Figure 15:
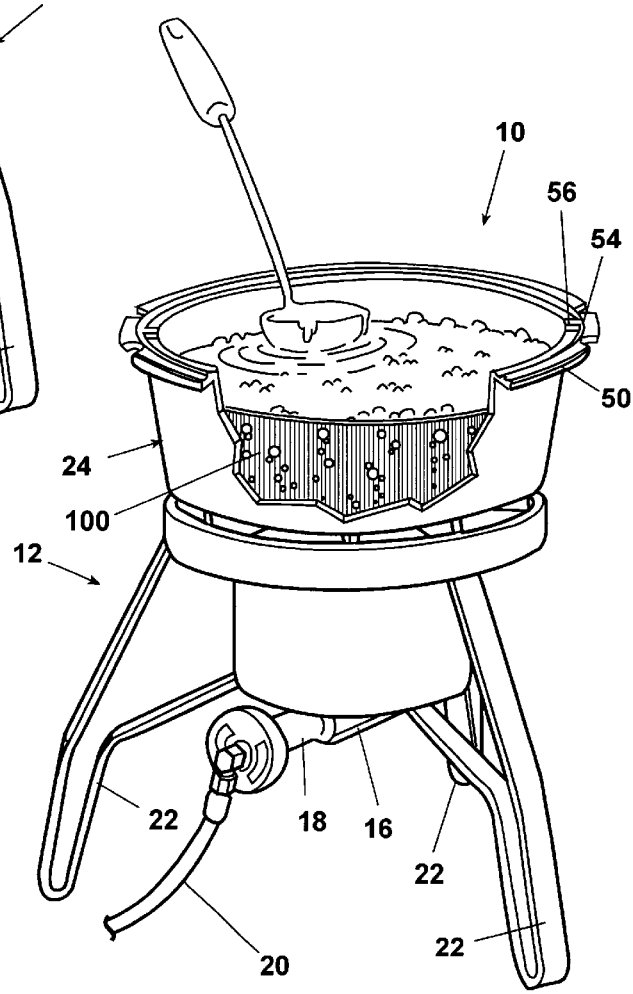
FIG. 15 is a perspective view of the cooking pot of FIG. 1 with the cover removed showing a liquid food provided therein, whereby placement of the base on a conventional gas cooker allows for boiling of the food therein.

FIG. 15 shows an additional configuration of the cooking pot 10 used for boiling liquids 100, such as soup, chili, stew, water, etc. In this configuration, the cover 26 is optional to cook the food product 100 within the base portion 24. Upon actuation of the gas cooker 12, the food product 100 is heated to a desired temperature at a desired rate.

Figure 16:
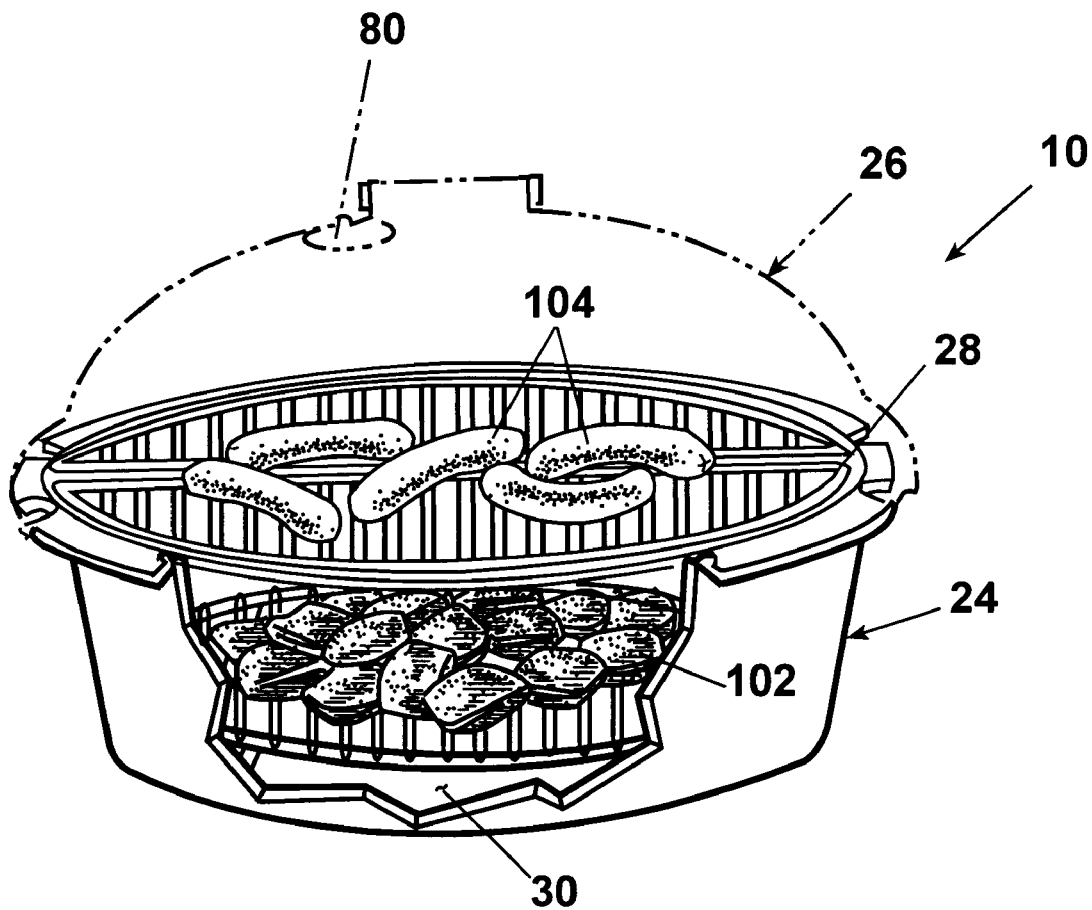
FIG. 16 shows the cooking pot of FIG. 1 provided with an upper rack with food thereon and a lower rack with charcoal thereon whereby the charcoal can be ignited in conventional fashion and the food can be grilled on the upper rack in a conventional fashion without the use of the gas cooker shown in the other figures.

FIG. 16 shows yet an additional configuration of the cooking pot 10 according to the invention wherein the base portion 24 is used as a hibachi-type grill. In the configuration shown, the lower rack 30 has been provided with several charcoal briquettes 102 and the upper rack 28 has been provided with several food products 104. Prior to placing the upper 28 and food products 104 thereon, the briquettes 102 can be ignited with conventional lighter fluids and allowed to rise to an appropriate temperature as is conventionally known. Once the briquettes 102 are so heated, the upper rack 28 and food products 104 can be positioned above the briquettes 102 and cooked in a conventional fashion. If the food 104 is to be cooked in a covered manner, the cover 26 can be placed upon the base portion 24 so that the protrusions 66 cover appropriate portions of the vent openings 52 and the air vent 80 is also positioned to a desired setting to ensure both appropriate circulation of air through the cooking pot 10 as well as exhaust of smoke emitting from the briquettes 102.

It can be seen from the drawings and the above description that the cooking pot 10 according to the invention provides a single cooking vessel by which several different cooking modes or methods can be employed. Other modes of cooking employing the cooking pot of the invention may occur to the experienced or innovative cook. Further, the cooking pot 10 need merely be washed between courses of a particular meal if a succession of different cooking methods are to be employed with the cooking pot 10 to prepare different types of foods according to different cooking methods.

It will be understood that the cooking racks described with respect to this invention can comprise conventional wire rack members, solid conventional or non-stick griddle surfaces, or any known cooking surface without departing from the scope of the invention.

The cooking pot 10 is also convenient to transport in that it has few pieces and is relatively lightweight when compared to the multiplicity of components of prior art cooking implements needed to accomplish the plurality of cooking modes of the pot 10 of the instant invention. Thus, the cooking pot 10 provides great advances in reducing storage space and ease of transport.

While the invention has been specifically described in connection with certain specific embodiments thereof, it is to be understood that this is by way of illustration and not of limitation, and the scope of the appended claims should be construed as broadly as the prior art will permit.

What is claimed is:

1. A multifunctional cooking pot including a base portion, a removable cover having an outer edge, the base portion and the cover defining a cooking chamber, the base portion comprising a liquid-retainable vessel having an upstanding wall terminating in an upper edge thereof, a removable lower rack supported within the base portion, a removable upper rack comprising at least one rack member supported on the base portion above the lower rack, and a cover support provided on the base portion outwardly of the upper rack for receiving the outer edge of the cover in seating relationship, whereby the cooking pot is operable in any one of a plurality of cooking modes including:

an open charcoal-grilling mode wherein the cover and the upper rack are removed from the base portion, charcoal is placed on the lower rack and ignited, the upper rack is replaced, and food to be cooked is placed on the upper rack;

a closed charcoal-grilling mode wherein the cover and the upper rack are removed from the base portion, charcoal is placed on the lower rack and ignited, the upper rack is replaced, food to be cooked is placed on the upper rack, and the cover is replaced;

an externally-heated charcoal-grilling mode wherein the cover and the upper rack are removed from the base portion, charcoal is placed on the lower rack, the base portion is placed over a source of heat to heat the charcoal, the upper rack member is replaced, food to be cooked is placed on the upper rack, and the cover is replaced;

a grilling and smoking mode wherein the cover and the upper rack are removed from the base portion, charcoal and wood chips are placed on the lower rack, the base portion is placed over a source of heat to heat the charcoal and the wood chips, the upper rack is replaced, food to be cooked is placed on the upper rack, and the cover is replaced;

a deep-frying mode wherein at least the cover and the upper rack are removed from the base portion, the base portion is partially filled with cooking oil, the food to be cooked is immersed in the cooking oil, and the base portion is placed over a source of heat;

a boiling and simmering mode wherein at least the cover and the upper rack are removed from the base portion, the base portion is partially filled with liquid, and the base portion is placed over a source of heat;

a steaming mode wherein the cover and the upper rack are removed from the base portion, the base portion is filled with water to a level below the lower rack, food to be steamed is placed on the lower rack, the upper rack is replaced, additional food to be steamed is placed on the upper rack, the cover is replaced, and the base portion is placed over a source of heat;

a first oven mode wherein the cover and the upper rack are removed from the base portion, food to be baked or roasted is placed on the lower rack, the cover is replaced, and the base portion is placed over a source of heat; and a second oven mode wherein the cover and the upper rack are removed from the base portion, food to be baked or roasted is placed on the lower rack, the upper rack is replaced, additional food is placed on the upper rack, the cover is replaced, and the base support is placed over a source of heat.

2. A mulitifunctional cooking pot according to claim 1, wherein the upper rack comprises a pair of rack members complementary to and coplanar with each other to overlie the base portion, the rack members being individually removable, whereby the cooking pot is operable in a further node comprising a deep-frying and draining mode wherein at least the cover and the upper rack members are removed from the base portion, the base portion is partially filled with cooking oil food to be cooked is immersed in the cooking oil, one of the upper rack members is replaced, the base portion is placed over a source of heat, and food so cooked is removed from the cooking oil and placed on said one upper rack member to drain.

3. A multifunctional cooking pot according to claim 1, wherein the outer edge of the cover is of generally annular configuration, and the upstanding wall is circular in transverse section, whereby the upper edge thereof is of annular form, the cover support comprising an annular lip extending radially outwardly from the upstanding wall at an upper portion thereof.

4. A multifunctional cooking pot according to claim 3, wherein the upstanding wall is of inverted frustoconical configuration.

5. A multifunctional cooking pot according to claim 1, wherein the cover comprises an upwardly domed wall terminating in the outer edge of the cover whereby the outer edge is of generally annular configuration, the domed wall being formed at a lower portion thereof with a pair of diametrically opposed radially and circumferentially extending protrusions interrupting the annular configuration of the outer edge, the an upstanding wall of the base portion being of circular transverse section, the cover support comprising an annular lip extending radially outwardly from the upstanding wall at an upper portion thereof, the annular lip being formed with two diametrically opposed pairs of vent openings therein, the vent openings of each pair thereof being circumferentially spaced from each other through a distance selected to permit both vent openings of each pair to lie entirely beneath one of the protrusions, whereby during the closed charcoal-grilling mode, the externally-heated charcoal grilling mode, the grilling and smoking mode, and the oven modes airflow into the cooking chamber is adjustable by rotating the cover relative to the base portion to align the protrusions with respective pairs of the vent openings to permit free airflow therethrough, to move the protrusions wholly out of alignment with the vent openings to prevent airflow therethrough, and to partially align the protrusions with the vent openings to selectively restrict airflow therethrough, and during the steaming mode egress of steam from the base portion is facilitated by rotating the cover relative to the base portion to align the protrusions with respective pairs of the vent openings.

6. A multifunctional cooking pot according to claim 5, wherein each of the vent openings comprises an indentation in the annular lip.

7. A multifunctional cooking pot according to claim 6, wherein the indentation is generally semicircular.

8. A multifunctional cooking pot according to claim 5, including an adjustable air vent provided in an upper portion of the domed wall of the cover.

9. A multifunctional cooking pot according to claim 5, including an aperture formed in an upper portion of the domed wall of the cover and dimensioned to receive a thermometer.

10. A multifunctional cooking pot according to claim 5, wherein the lip is continuous except at the vent openings.

\* \* \* \* \*

UNITED STATES PATENT AND TRADEMARK OFFICE
CERTIFICATE OF CORRECTION

PATENT NO.      : 6,293,271 B1
DATED           : September 25, 2001
INVENTOR(S)     : Rodney A. Barbour It is certified that error appears in the above-identified patent and that said Letters Patent is hereby corrected as shown below:

<u>Column 8,</u>
Line 21, after "thereof," insert the phrase -- at least one of the cover and the base portion having a vent therein --.
Lines 27 and 28, delete the phrase "any one of".

<u>Column 9,</u>
Line 19, "node" should be -- mode --.
Line 22, after "oil" insert -- , --.

<u>Column 10,</u>
Line 4, after "the" delete "an".

Signed and Sealed this

Thirteenth Day of August, 2002

*Attest:*

*Attesting Officer*

JAMES E. ROGAN
*Director of the United States Patent and Trademark Office*